US012036889B2

(12) United States Patent
Sato et al.

(10) Patent No.: US 12,036,889 B2
(45) Date of Patent: Jul. 16, 2024

(54) ENERGY SUPPLY SYSTEM, INFORMATION PROCESSING APPARATUS, AND METHOD

(71) Applicant: Toyota Jidosha Kabushiki Kaisha, Toyota (JP)

(72) Inventors: Aya Sato, Miyoshi (JP); Kuniaki Jinnai, Nagoya (JP); Taiki Yamashita, Toyota (JP); Eduard Vandersmitte, McKinney, TX (US); Gunnar Heinisch, McKinney, TX (US); Jake Morrow, Carrolton, TX (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 265 days.

(21) Appl. No.: 17/398,460

(22) Filed: Aug. 10, 2021

(65) Prior Publication Data
US 2022/0048403 A1 Feb. 17, 2022

(30) Foreign Application Priority Data

Aug. 11, 2020 (JP) ................. 2020-136060

(51) Int. Cl.
B60L 58/12 (2019.01)
B60L 53/57 (2019.01)
B60L 53/62 (2019.01)
B60W 60/00 (2020.01)

(52) U.S. Cl.
CPC ............ B60L 58/12 (2019.02); B60L 53/57 (2019.02); B60L 53/62 (2019.02); B60W 60/0025 (2020.02)

(58) Field of Classification Search
None
See application file for complete search history.

(56) References Cited

U.S. PATENT DOCUMENTS

| 2012/0109409 A1 | 5/2012 | Hara | |
| 2016/0129793 A1* | 5/2016 | Cronie | H02J 50/90 320/109 |
| 2018/0241234 A1* | 8/2018 | Liang | B60L 53/65 |

(Continued)

FOREIGN PATENT DOCUMENTS

| CN | 102564426 A | 7/2012 |
| JP | H07170612 A | 7/1995 |
| JP | 2011022972 A | 2/2011 |

(Continued)

Primary Examiner — James J Lee
Assistant Examiner — Jonathan E. Reinert
(74) Attorney, Agent, or Firm — Dinsmore & Shohl LLP

(57) ABSTRACT

An energy supply system includes at least one energy supply vehicle and an information processing apparatus. The at least one energy supply vehicle is configured to be able to supply energy to at least one target vehicle that is subject to energy supply. The information processing apparatus is configured to manage operation of the at least one energy supply vehicle. The information processing apparatus is configured to create an operation schedule including a supply schedule for supplying energy to the at least one target vehicle, based on a travel plan for the at least one target vehicle and information on a remaining energy amount that are received from the at least one target vehicle, and transmit the created operation schedule to the at least one energy supply vehicle.

20 Claims, 11 Drawing Sheets

(56) References Cited

U.S. PATENT DOCUMENTS

2020/0262305 A1* 8/2020 Chakraborty ........... B60L 53/57
2020/0317074 A1* 10/2020 Miller ................ G01C 21/3664

FOREIGN PATENT DOCUMENTS

| JP | 2013025595 A | 2/2013 |
| JP | 2015-043238 A | 3/2015 |
| JP | 2018068051 A | 4/2018 |

* cited by examiner

*FIG. 6*

| LOCATION | DISTANCE (KM) BETWEEN SECTIONS | SCHEDULED TIME |
|---|---|---|
| POINT S (DEPARTURE) | 25 | 8:00 |
| POINT A (ON WAY) | 70 | 8:40 |
| POINT B (ON WAY) | 55 | 9:50 |
| POINT C (ARRIVAL) | — | 10:40 |
| POINT C (DEPARTURE) | 30 | 11:40 |
| . . . | . . . | . . . |
| POINT S (ARRIVAL) | — | 14:30 |

FIG. 7

| | START POSITION | START TIME | END POSITION | END TIME | TARGET VEHICLE ID |
|---|---|---|---|---|---|
| SUPPLY SCHEDULE 1 | POINT A | 12:10 | POINT B | 12:40 | No.100001 |
| SUPPLY SCHEDULE 2 | POINT C | 13:10 | POINT D | 13:50 | No.100002 |
| SUPPLY SCHEDULE 3 | ... | ... | ... | ... | ... |
| ... | ... | ... | ... | ... | ... |

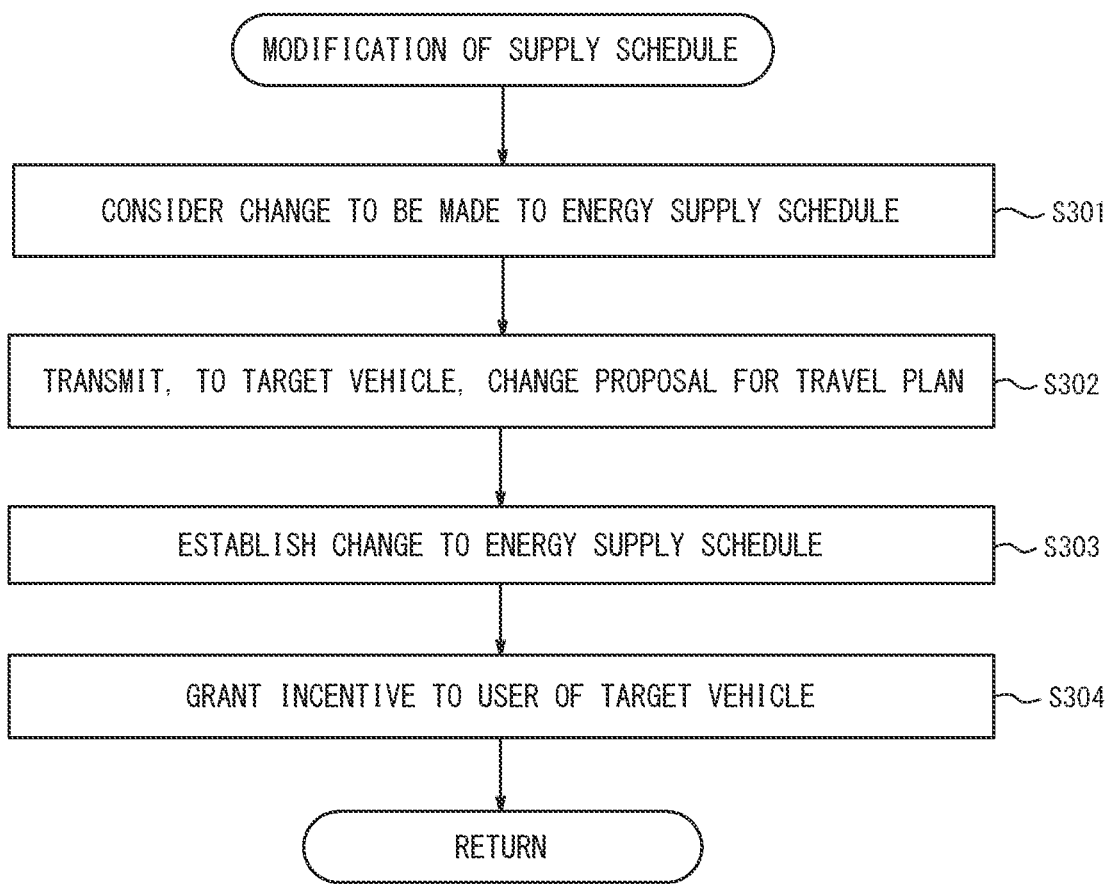

ENERGY SUPPLY SYSTEM, INFORMATION PROCESSING APPARATUS, AND METHOD

CROSS-REFERENCE TO RELATED APPLICATION

This application claims priority to Japanese Patent Application No. 2020-136060 filed on Aug. 11, 2020, the entire contents of which are incorporated herein by reference.

TECHNICAL FIELD

The present disclosure relates to an energy supply system, an information processing apparatus, and a method.

BACKGROUND

In unmanned transport systems used in automated warehouses or the like, there has been proposed a system in which transport vehicles traveling adjacent to each other on tracks transmit and receive information regarding the remaining battery charges so that one transport vehicle whose remaining battery charge is lower can receive electric power from another transport vehicle whose remaining battery charge is higher (for example, Patent Literature [PTL] 1).

CITATION LIST

Patent Literature

PTL 1: JP 2015-043238 A

SUMMARY

In areas with a few places to supply driving energy, energy supply devices, in addition to energy supply stations installed in specific locations, may be provided. The existing technology of PTL 1 is applied to closed areas, such as automated warehouses. According to this method, vehicles are not always able to receive energy if a vehicle with a high remaining energy amount is not present nearby. Further, vehicles travelling on regular roads are not managed by a single operator. It is therefore difficult to apply energy transfer between vehicles according to the aforementioned mechanism to vehicles travelling on regular roads.

It would be helpful to increase opportunities to supply energy for travelling to a vehicle that travels on a road.

An energy supply system according to an embodiment of the present disclosure includes at least one energy supply vehicle and an information processing apparatus. The at least one energy supply vehicle is configured to be able to supply energy to at least one target vehicle that is subject to energy supply. The information processing apparatus is configured to manage operation of the at least one energy supply vehicle. The information processing apparatus is configured to create an operation schedule including a supply schedule for supplying energy to the at least one target vehicle, based on a travel plan for the at least one target vehicle and information on a remaining energy amount that are received from the at least one target vehicle. The information processing apparatus is configured to transmit the created operation schedule to the at least one energy supply vehicle.

An information processing apparatus according to an embodiment of the present disclosure manages operation of at least one energy supply vehicle configured to be able to supply energy to at least one target vehicle that is subject to energy supply. The information processing apparatus includes a communication interface and a controller. The communication interface is configured to be able to receive, from the at least one target vehicle, a travel plan for the at least one target vehicle and information on a remaining energy amount. The controller is configured to create an operation schedule including a supply schedule for supplying energy to the at least one target vehicle, based on the travel plan and the information on the remaining energy amount that are received through the communication interface. The controller is configured to transmit the created operation schedule to the at least one energy supply vehicle via the communication interface.

A method according to an embodiment of the present disclosure includes receiving, by an information processing apparatus and from at least one target vehicle that is subject to energy supply, a travel plan for the at least one target vehicle and information on a remaining energy amount. The method includes creating, by the information processing apparatus, an operation schedule including a supply schedule for supplying energy to the at least one target vehicle, based on the travel plan and the information on the remaining energy amount that are received. The method includes transmitting, by the information processing apparatus, the created operation schedule to at least one energy supply vehicle configured to be able to supply energy to the at least one target vehicle.

According to the present disclosure, an energy supply system, an information processing apparatus, and a method that are capable of increasing opportunities to supply energy for travelling to a vehicle traveling on a road can be provided.

BRIEF DESCRIPTION OF THE DRAWINGS

In the accompanying drawings:

FIG. 6 schematically illustrates an example of a travel plan of the target vehicle;

FIG. 7 schematically illustrates an example of an operation schedule of an energy supply vehicle;

FIG. 11 is a flowchart illustrating energy supply schedule modification processing by the information processing apparatus.

DETAILED DESCRIPTION

An embodiment of the present disclosure will be described below with reference to the drawings. The drawings used in the following description are schematic. Dimensional ratios or the like on the drawings do not necessarily match actual ones.

(Overall Configuration of Energy Supply System)

Figure 1:
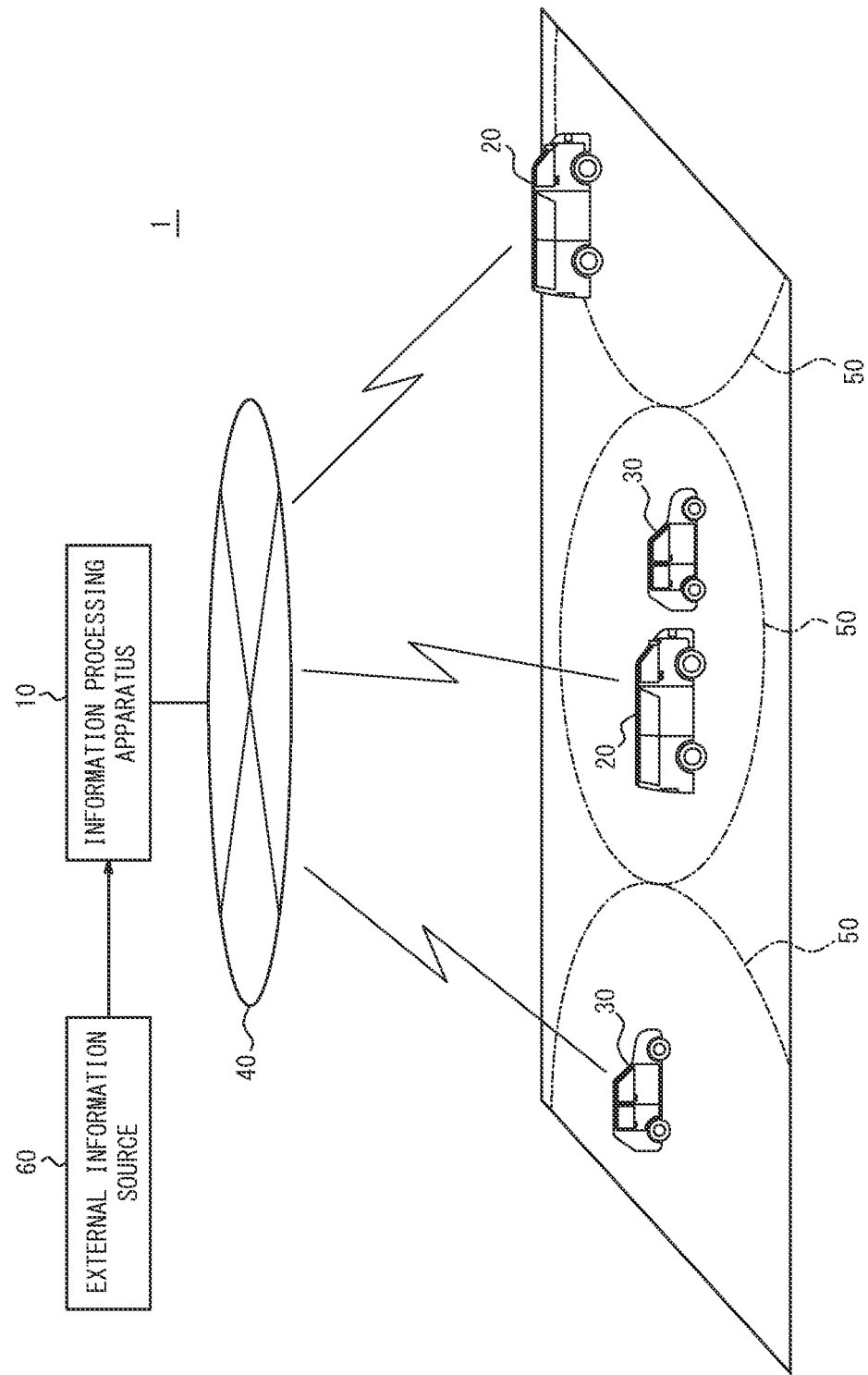
FIG. 1 illustrates a schematic configuration of an energy supply system according to an embodiment.

As illustrated in FIG. 1, an energy supply system 1 according to an embodiment of the present disclosure includes an information processing apparatus 10 and one or more energy supply vehicles 20. The information processing apparatus 10 and the one or more energy supply vehicle 20 are communicably connected to each other via a network 40. The information processing apparatus 10 may be connected to a relay base station of the network 40 via a wired or wireless line. The one or more energy supply vehicles 20 may each be connected to a relay base station of the network 40 by a wireless communication line. The network 40 may include the Internet, a Virtual Private Network (VPN), and the like.

Energy supply vehicles 20 can supply energy to target vehicles 30 that are subject to energy supply. The information processing apparatus 10 manages operations of the energy supply vehicles 20. As described below, the information processing apparatus 10 creates an operation schedule including a supply schedule for supplying energy to a target vehicle 30, based on a travel plan for the target vehicle 30 and information on a remaining energy amount that are received from the target vehicle 30. The information processing apparatus 10 transmits the created operation schedule to an energy supply vehicle 20. Thus, the energy supply vehicle 20 supplies energy to the target vehicle 30 in accordance with the operation schedule.

In an embodiment of the present disclosure, the energy supply system 1 includes a plurality of energy supply vehicles 20. Coverage areas 50, that is, geographic areas in which energy supply is to be performed, are defined for the energy supply vehicles 20. The information processing apparatus 10 creates operation schedules so that energy supply vehicles 20 are to supply energy to target vehicles 30 only within the specific coverage areas 50. There may always be one or more energy supply vehicles 20 in each coverage area 50.

In the present disclosure, energy is used as a motive power source for target vehicles 30. Energy includes fuels, such as gasoline and diesel oil, and electricity. Thus, target vehicles 30 include gasoline vehicles, diesel vehicles, and electric vehicles. Target vehicles 30 may further include hybrid vehicles powered by gasoline and electricity. Target vehicles 30 may also include fuel cell vehicles using hydrogen for motive power. In the present disclosure, target vehicles 30 are vehicles configured to be able to receive energy from energy supply vehicles 20. In the following description, it is sometimes assumed that energy is electric power. Energy is, however, not limited to electric power.

Further, in the following discussion, it is assumed that energy supply vehicles 20 and target vehicles 30 are automated vehicles that are autonomous. In this case, target vehicles 30 and energy supply vehicles 20 perform automated driving in cooperation with each other while energy supply is being performed. Target vehicles 30 and energy supply vehicles 20 may be controlled in a coordinated manner by communicating with each other through vehicle-to-vehicle communication while energy supply is being performed. Energy supply vehicles 20 and target vehicles 30 are, however, not limited to automated vehicles. Energy supply vehicles 20 and target vehicles 30 may be driven at least partially manually.

In FIG. 1, an external information source 60 is an information source that is provided outside the energy supply system 1 and that enables the information processing apparatus 10 to acquire information, such as traffic information. The external information source 60 may be operated by a traffic management authority or a private traffic information provider. The external information source 60 provides, for example, congestion information, accident information, traffic regulatory information, or the like to the information processing apparatus 10. The external information source 60 transmits traffic information to the information processing apparatus 10 using any communication method. The external information source 60 and the information processing apparatus 10 may communicate via the network 40.

(Configuration of Information Processing Apparatus)

Figure 2:
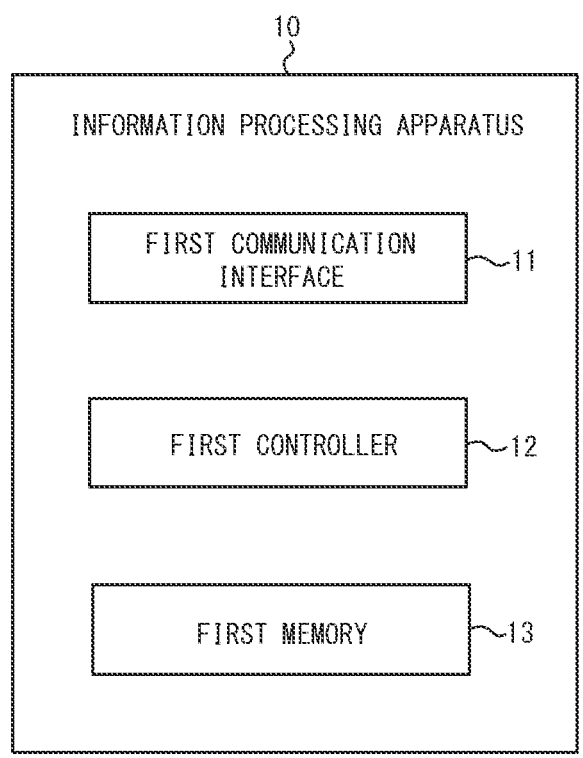
FIG. 2 is a block diagram illustrating a schematic configuration of an information processing apparatus of FIG. 1.

As illustrated in FIG. 2, the information processing apparatus 10 includes a first communication interface 11, a first controller 12, and a first memory 13. The information processing apparatus 10 is not limited to a single type of hardware and may be composed of a plurality of types of hardware connected by a Local Area Network (LAN) or the like. A plurality of types of hardware equipped with the functions of the information processing apparatus 10 can also be arranged in a geographically distributed manner via the network 40.

The first communication interface 11 includes a communication module for connection with the network 40. The communication module may include a communication module compliant with any one or more of various communication standards, such as a wired LAN, a wireless LAN, an optical communication line, or a digital subscriber line. The first communication interface 11 can perform processing, such as protocol processing pertaining to information transmission and receipt, modulation of transmitted signals, or demodulation of received signals. The information processing apparatus 10 is connected to the network 40 via the first communication interface 11.

The first controller 12 includes a single processor or a plurality of processors. In the present disclosure, processors include general purpose processors that execute programmed functions by loading a program, and dedicated processors that are dedicated to specific processing. Dedicated processors may include Digital Signal Processors (DSPs), Application Specific Integrated Circuits (ASICs), Field-Programmable Gate Arrays (FPGAs), and the like. The first controller 12 may further include a memory.

The first controller 12 controls operations of the entire information processing apparatus 10. Processing executed by the information processing apparatus 10 can be referred to as processing executed by the first controller 12. The first controller 12 can transmit and receive information to and from an energy supply vehicle 20 and a target vehicle 30 via the first communication interface 11. The first controller 12 can receive, via the first communication interface 11 from a target vehicle 30, a travel plan and information on a remaining energy amount. Based on the travel plan for the target vehicle 30 and the information on the remaining energy amount, the first controller 12 can create an operation schedule including a supply schedule for supplying energy to the target vehicle 30. The first controller 12 can transmit the created operation schedule to an energy supply vehicle 20 via the first communication interface 11.

The first controller 12 may periodically acquire positional information for an energy supply vehicle 20 and a target vehicle 30 via the first communication interface 11. The first controller 12 can detect a deviation from a travel plan of the target vehicle 30, and a deviation from an operation schedule of the energy supply vehicle 20. Based on these deviations, the first controller 12 may update the operation schedule of the energy supply vehicle 20.

The first memory 13 stores various types of information used for operations of the information processing apparatus 10. The first memory 13 may include a semiconductor storage device, a magnetic storage device, and an optical storage device. Semiconductor storage devices may include memories, such as Read Only Memory (ROM), Random Access Memory (RAM), or flash memory. The first memory 13 may store travel plans received from different target vehicles 30, and operation schedules of different energy supply vehicles 20.

Figure 3:
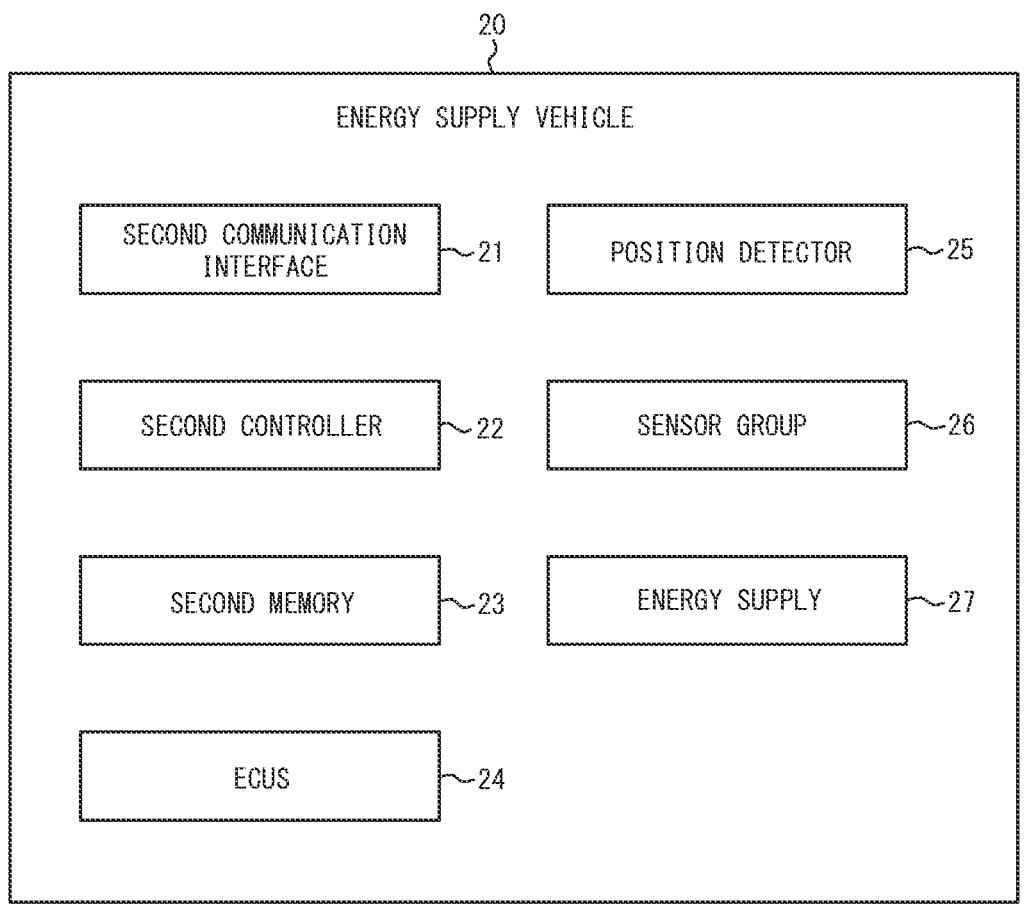
FIG. 3 is a block diagram illustrating a schematic configuration of an energy supply vehicle of FIG. 1.

(Configuration of Energy Supply Vehicle) As illustrated in FIG. 3, each energy supply vehicle 20 includes a second communication interface 21, a second controller 22, a second memory 23, ECUs 24, a position detector 25, a sensor group 26, and an energy supply 27. The components of the energy supply vehicle 20 are communicably connected to each other by a network, such as a Controller Area Network (CAN), in the energy supply vehicle 20.

The second communication interface 21 includes a communication module for connection with the network 40 and for communication with the information processing apparatus 10. The second communication interface 21 may include a communication module for direct communication with a target vehicle 30. The communication module includes, but is not limited to, a communication module compliant with a mobile communication standard, such as the 4th Generation (4G) standard or the 5th Generation (5G) standard.

The second controller 22 controls the entire energy supply vehicle 20. Processing executed by the energy supply vehicle 20 can be referred to as processing executed by the second controller 22. The second controller 22 includes a single processor or a plurality of processors and a memory, as is the case described for the first controller 12. The second controller 22 controls driving of the energy supply vehicle 20 in accordance with an operation schedule that is received from the information processing apparatus 10 via the second communication interface 21. The second controller 22 cooperates with the ECUs 24, the position detector 25, and the sensor group 26, to thereby achieve automated driving of the energy supply vehicle 20. The automated driving may include, for example, any level from Level 1 to Level 5 as defined by the Society of Automotive Engineers (SAE), but is not limited to these, and may be defined in any way. In the present embodiment, the energy supply vehicle 20 will be described as being capable of driverless automated driving (e.g., Level 5 automated driving defined by the SAE).

The second controller 22 controls the components of the energy supply vehicle 20, including the ECUs 24, so as to perform automated driving in accordance with an operation schedule and supply energy to a target vehicle 30.

The second memory 23 stores any information used for operations of the energy supply vehicle 20. The second memory 23 may include various storage devices, as is the case described for the first memory 13. The second memory 23 may store information on a road map. The second memory 23 may store an operation schedule received from the information processing apparatus 10.

The ECUs 24 are a plurality of Electronic Control Units (ECUs) that control respective pieces of equipment in the energy supply vehicle 20. The equipment in the energy supply vehicle 20 related to the ECUs 24 includes, but is not limited to, an engine, a motor, a brake, a transmission, a navigational system or the like. The ECUs 24 are connected with each other via a network, such as the Controller Area Network (CAN).

The position detector 25 detects the position of the energy supply vehicle 20. The position of the energy supply vehicle 20 may be detected as an absolute position defined by a latitude and longitude, etc. The position detector 25 may include various detecting apparatuses, including a receiving apparatus compliant with Global Navigation Satellite System (GNSS), an orientation sensor, a steering angle sensor, a range sensor, or the like. A GNSS can measure the position of the energy supply vehicle 20 using artificial satellites. By using signals from a GNSS receiving apparatus, information regarding the latitude and longitude at the current position of the energy supply vehicle 20 can be acquired. As the receiving apparatus compliant with GNSS, a Global Positioning System (GPS) receiving apparatus can be employed. The position detector 25 may also employ a receiving apparatus compliant with a different GNSS, instead of GPS receiving apparatuses or in addition to GPS receiving apparatuses. The different GNSS includes, for example, a satellite positioning system using quasi-zenith satellites. The orientation sensor, the steering angle sensor, and the range sensor can be used to assist in position detection using GNSS.

The sensor group 26 includes various sensors mounted on the energy supply vehicle 20. The sensor group 26 are interconnected with the ECUs 24 and can be used for driving control. Sensors included in the sensor group 26 used for driving control include, but are not limited to, a vehicle speed sensor, an acceleration sensor, a brake sensor, a sensor for forward distances between vehicles, a sensor for backward distances between vehicles, a driving lane detection sensor, an image sensor, or the like.

The energy supply 27 has a mechanism required to supply energy to a target vehicle 30. The specific configuration of the energy supply 27 varies depending on energy to be supplied. In a case in which energy to be supplied is electric power, the energy supply 27 may include a storage battery, and cables and connection terminals for connection to a target vehicle 30. Alternatively, the energy supply 27 may include a non-contact power supply device that is capable of supplying power to a target vehicle 30. As the non-contact power supply system, a magnetic field coupling method may be employed.

(Configuration of Target Vehicle)

Figure 4:
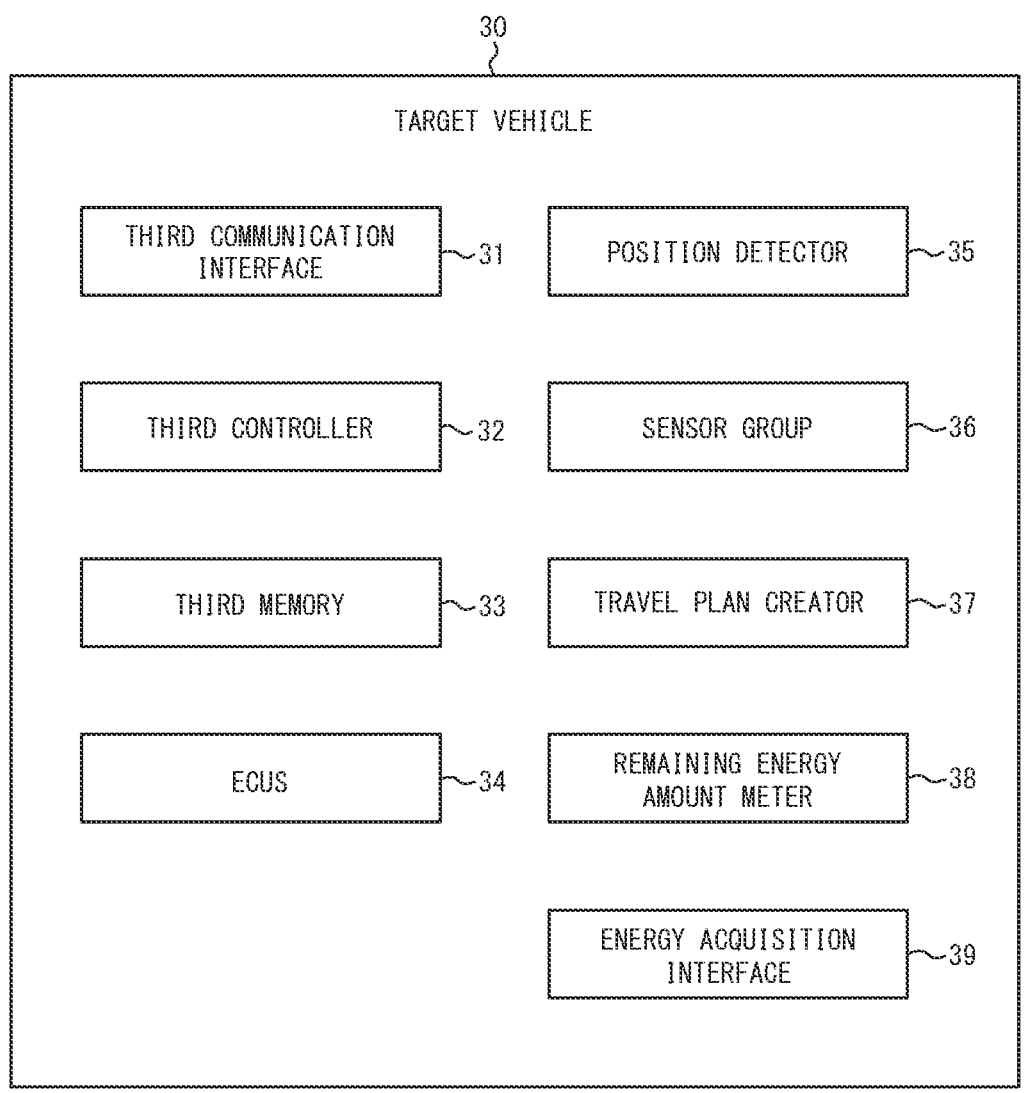
FIG. 4 is a block diagram illustrating a schematic configuration of a target vehicle of FIG. 1.

As illustrated in FIG. 4, each target vehicle 30 includes a third communication interface 31, a third controller 32, a third memory 33, ECUs 34, a position detector 35, a sensor group 36, a travel plan creator 37, a remaining energy amount meter 38, and an energy acquisition interface 39. The components of the target vehicle 30 are communicably connected to each other by a network, such as a Controller Area Network (CAN), in the target vehicle 30. The third communication interface 31, the third controller 32, the third memory 33, the ECUs 34, the position detector 35, and the sensor group 36 are respectively similar to the second communication interface 21, the second controller 22, the second memory 23, the ECUs 24, the position detector 25, and the sensor group 26 of an energy supply vehicle 20. Accordingly, as for the third communication interface 31, the third controller 32, the third memory 33, the ECUs 34, the position detector 35, and the sensor group 36, only differences from the corresponding components of an energy supply vehicle 20 will be described.

The third communication interface 31 may include a communication module for direct communication with an energy supply vehicle 20, in addition to a communication module for connection with the network 40 and for communication with the information processing apparatus 10.

The third controller 32 can transmit, to the information processing apparatus 10 via the third communication interface 31, a travel plan created by the travel plan creator 37 and information on a remaining energy amount acquired from the remaining energy amount meter 38. The third controller 32 may receive an energy supply schedule from the information processing apparatus 10 via the third communication interface 31. The third controller 32 controls the components of the target vehicle 30, including the ECUs 34, so as to perform automated driving in accordance with a travel plan and receive energy supply from an energy supply vehicle 20 in accordance with the energy supply schedule.

The third memory 33 stores a target vehicle ID which is identification information for the vehicle itself. The third memory 33 may store a travel plan created by the travel plan creator 37 and an energy supply schedule that is received from the information processing apparatus 10.

The travel plan creator 37 is used by a user of the target vehicle 30 to create a travel plan. The travel plan creator 37 does not need to be an independent apparatus. The travel plan creator 37 may be included in the third controller 32 or in the ECUs 34. The travel plan creator 37 may be embodied, for example, as part of a navigational system. The travel plan creator 37 receives, from the user of the target vehicle 30, inputs indicating a departure point, waypoints, a destination, a departure time, or the like. The travel plan creator 37 creates a traveling plan based on information inputted by the user. The travel plan may include information regarding major waypoints on the travel route, and arrival, passing, or departure times at the waypoints. The major waypoints on the travel path may include intersections, highway entrances and exits, service areas, and the like.

A travel plan is created not necessarily by the travel plan creator 37 mounted on the target vehicle 30. The user may create a travel plan using an ordinary computer, a portable information device, or a smartphone at locations outside the target vehicle 30. In this case, the created travel plan may be transmitted to the target vehicle 30.

The remaining energy amount meter 38 measures the remaining energy amount of the target vehicle 30. In a case in which the target vehicle 30 is a gasoline vehicle or a diesel vehicle, the remaining energy amount meter 38 may be a fuel meter. In a case in which the target vehicle 30 is an electric vehicle, the remaining energy amount meter 38 may be a remaining battery charge meter.

The energy acquisition interface 39 acquires energy from the energy supply 27 of an energy supply vehicle 20. In a case in which energy supplied from the energy supply vehicle 20 is electric power and the energy supply 27 of the energy supply vehicle 20 and the energy acquisition interface 39 are connected in contact with each other, the energy acquisition interface 39 may have a connection terminal corresponding to the energy supply 27.

In a case in which the energy supply 27 of the energy supply vehicle 20 includes a non-contact power supply apparatus, the energy acquisition interface 39 may include a power receiving apparatus compliant with a power supply method of the energy supply 27. The energy supply 27 of the energy supply vehicle 20 and the energy acquisition interface 39 of the target vehicle 30 may respectively include a power supply coil and a power receiving coil. The power supply coil and the power receiving coil may be positioned so as to face each other when the energy supply vehicle 20 and the target vehicle 30 travel adjacent to each other. This allows the target vehicle 30 to receive energy from the energy supply vehicle 20 while travelling.

(Assumed Case)

Next, with reference to FIG. 5 to FIG. 9, an assumed case of energy supply according to the energy supply system 1 will be described.

Figure 5:
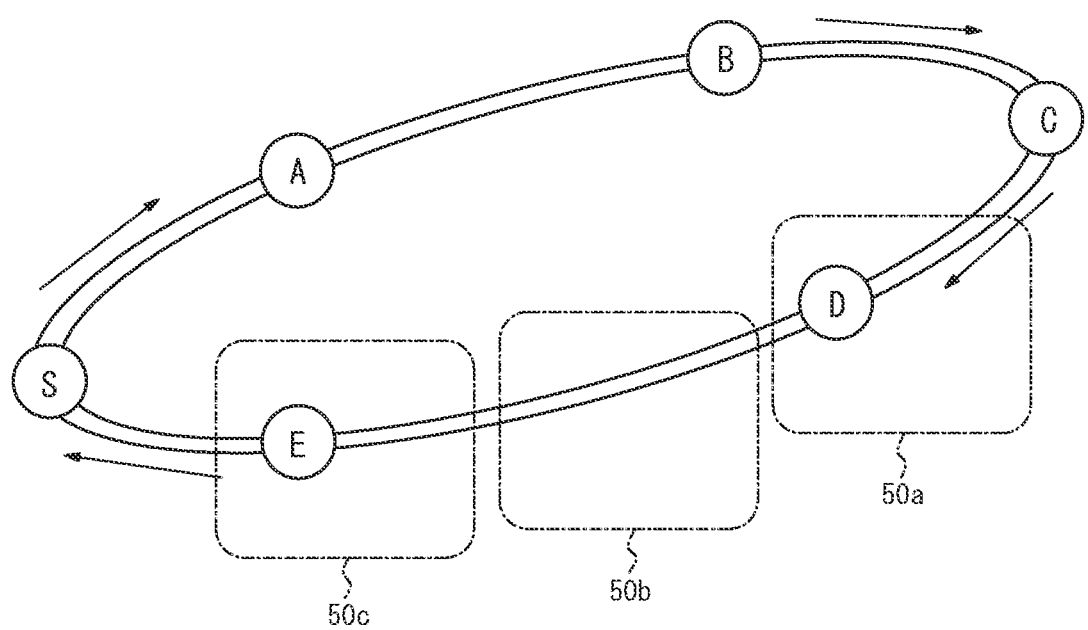
FIG. 5 illustrates an example of a route along which a target vehicle is scheduled to travel.

In this example, as illustrated in FIG. 5, it is assumed that a target vehicle 30 departs from point S as the departure point and heads to point C as the destination, and after staying at point C, returns to point S along a route different from the outward route. Point A and point B exist between point S and point C on the outward trip. Point D and point E exist between point C and point S on the return route.

Before departure, the user inputs information regarding point S and point C, a departure time, staying time, or the like to the travel plan creator 37 of the target vehicle 30 to thereby create a travel plan. FIG. 6 schematically illustrates an example of a travel plan. The travel plan includes locations of and passing times at point A, point B, point D, and point E which are major waypoints. In FIG. 6, the a "distance between sections" indicates a distance from a point indicated in the "location" of the same row to another point following that point.

The travel plan may further include information that can be used for calculation of energy consumption. For example, the travel plan may include information for distinguishing whether predetermined sections are regular roads or highways. Energy consumption required to travel a unit distance on a highway is less than that on a regular road. Further, energy consumption increases on a bumpy road. The travel plan may include information regarding fuel efficiency or power efficiency that is forecasted for each section to be travelled. Such forecasting of energy consumption per distance may be made by the first controller 12 of the information processing apparatus 10.

The third controller 32 of the target vehicle 30 transmits, via the third communication interface 31 to the information processing apparatus 10, the travel plan created by the travel plan creator 37, information on a remaining energy amount acquired from the remaining energy amount meter 38, and the target vehicle ID as identification information for identifying the vehicle itself at an appropriate timing. The travel plan creator 37 may update the travel plan sequentially even while travelling. The travel plan may change due to traffic congestion, a break during travel, or the like. When the travel plan is updated, the third controller 32 may sequentially transmit the updated travel plan, together with the target vehicle ID and information on a remaining energy amount, to the information processing apparatus 10.

The first controller 12 of the information processing apparatus 10 receives travel plans from one or more target vehicles 30. The first controller 12 determines, for each target vehicle 30, whether the target vehicle 30 is in need of energy supply, based on the travel plan and the information on a remaining energy amount. For example, in a case in which a shortage of energy can occur in the vicinity of point E on the way back from point C to point S with respect to a target vehicle 30 passing along the route as illustrated in FIG. 5, the first controller 12 may determine that energy supply needs to be performed in a coverage area 50a or a coverage area 50b before point E. On the other hand, in a case in which the remaining energy amount is higher than or equal to a predetermined level, the first controller 12 may determine that there is no need to perform energy supply.

Based on travel plans of one or more target vehicles 30 that have been determined to be in need of energy supply and the current operation schedule of each energy supply vehicle 20, the first controller 12 may select an energy supply vehicle 20 that is to supply energy to the target vehicles 30. In a case in which an additional target vehicle 30 has been determined to be in need of energy supply, the first controller 12 creates an operation schedule of a selected energy supply vehicle 20 so as to include a supply schedule for supplying energy to that target vehicle 30. The first controller 12 transmits the created operation schedule to the selected energy supply vehicle 20 via the first communication interface 11. Upon receiving the operation schedule via the second communication interface 21, the second controller 22 of the energy supply vehicle 20 updates the current operation schedule with the newly received operation schedule.

For example, as schematically illustrated in FIG. 7, an operation schedule of an energy supply vehicle 20 may include a schedule for supplying energy to one or more target vehicles 30. The energy supply vehicle 20 is autonomously operated in accordance with the operation schedule. In FIG. 7, a "start position" and an "end position" respectively indicate a supply start position at which energy supply is to start and a supply end position at which energy supply is to end. A "start position" and an "end position" may be identified, for example, by latitudes and longitudes, or the like. Alternatively, a "start position" and an "end position" may be identified by distances from certain intersections on roads or the like. A "start time" and an "end time" respectively indicate a time at which energy supply is to start and a time at which energy supply is to end. During a time period from a "start time" to an "end time", energy supply from the energy supply vehicle 20 to a target vehicle 30 is performed. The time period for which energy supply is to be performed may be determined based on the remaining energy amount of the target vehicle 30 and a remaining travel distance included in the travel plan of the target vehicle 30.

A "start position" and an "end position" may be set by considering traffic information acquired from the external information source 60. For example, the information processing apparatus 10 can receive, from the external information source 60, congestion information including information related to a congested area on a road. The first controller 12 of the information processing apparatus 10 may determine the operation schedule so that a "start position" at which energy supply to a target vehicle 30 is to start does not fall within the congested area. If a "start position" falls within the congested area, it is sometimes difficult for an energy supply vehicle 20 and a target vehicle 30 to approach each other. Preventing a "start position" from falling within the congested area allows an energy supply vehicle 20 and a target vehicle 30 to approach each other without difficulty. This enables smooth energy supply.

A "target vehicle ID" is identification information for a target vehicle 30 that the information processing apparatus 10 receives from the target vehicle 30 along with the travel plan. A "target vehicle ID" may be transmitted to the energy supply vehicle 20 along with the operation schedule. When supplying energy to a target vehicle 30, the energy supply vehicle 20 acquires a target vehicle ID from the target vehicle 30 and collates a target vehicle ID transmitted from the information processing apparatus 10 with the target vehicle ID obtained from the target vehicle 30. The energy supply vehicle 20 starts energy supply when both the target vehicle IDs match. In this way, the energy supply vehicle 20 can provide energy to a target vehicle 30 that is validated.

In an embodiment, coverage areas 50 in which energy supply to target vehicles 30 is to be performed are defined for energy supply vehicles 20 in advance. Accordingly, the information processing apparatus 10 creates an operation schedule so that an energy supply vehicle 20 supplies energy to a target vehicle 30 only within the coverage area 50. Energy supply vehicles 20 do not supply energy beyond the boundaries of the coverage areas 50 and thus outside the coverage areas 50. By doing so, a predetermined number of energy supply vehicles 20 are always present within the defined coverage areas 50. Thus, a certain number of energy supply vehicles 20 can be provided at all times, even when the coverage areas 50 are areas with a few energy supply facilities, such as gas stations or charging stations. This enables reliable energy supply to target vehicles 30.

The first controller 12 of the information processing apparatus 10 can evaluate the feasibility of an operation schedule as required. The information processing apparatus 10 can evaluate the feasibility of an operation schedule by quantifying it. Upon determining that the feasibility is lower than a predetermined criterion, the first controller 12 may transmit, to a target vehicle 30, change proposal information to change the travel plan. For example, in a case in which an energy supply vehicle 20 acquires, from the external information source 60, congestion information indicating that congestion is occurring on its route to an energy supply start position, the first controller 12 may evaluate the feasibility of the operation schedule. Further, for example, in a case in which a schedule for supplying energy to a target vehicle 30 is newly added to an operation schedule of a certain energy supply vehicle 20, the first controller 12 may evaluate the feasibility of the operation schedule.

Figure 8:
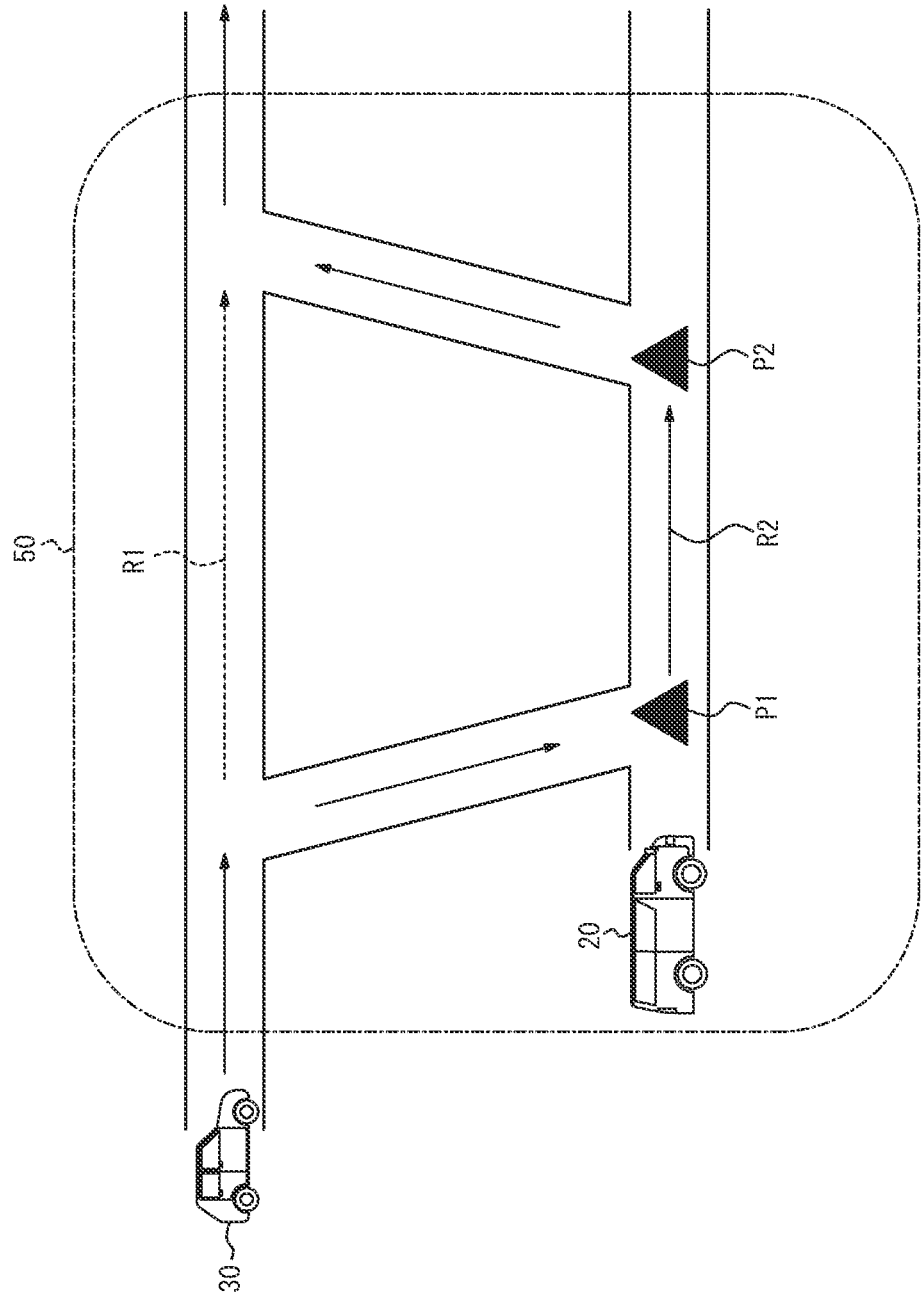
FIG. 8 illustrates an example of a change to the travel plan of the target vehicle.

As illustrated in FIG. 8, for example, suppose a case in which, although a target vehicle 30 is scheduled to travel along a route including first route R1 indicated by a broken line in the travel plan, an energy supply vehicle 20 runs out of time to go to first route R1. In this case, the first controller 12 generates change proposal information to change the travel plan so that the target vehicle 30 can travel on second route R2 indicated by a solid line and transmit the generated change proposal information to the target vehicle 30. Upon receiving the change proposal information, the target vehicle 30 may present the content of a change to the user of the target vehicle 30 and wait for an input of a determination indicating whether to accept the change. Alternatively, when the target vehicle 30 receives the change proposal information, the third controller 32 of the target vehicle 30 may determine whether to accept the change by evaluating an impact on the entire travel plan. In a case in which the target vehicle 30 accepts the change proposal information, the target vehicle 30 changes the travel plan. The first controller 12 of the information processing apparatus 10 also updates the operation schedule of the corresponding energy supply vehicle 20 and transmits the updated operation schedule to the energy supply vehicle 20. Thus, the target vehicle 30 receives energy from the energy supply vehicle 20 between start position P1 and end position P2 on second route R2.

The first controller 12 of the information processing apparatus 10 may perform a process of granting a predetermined incentive to a user of a target vehicle 30 that has received the change proposal information and that has accepted the change to the travel plan. The incentive may include a pricing discount on energy supply by the energy supply system 1, points in a point service provided by the energy supply system 1, issuance of discount coupons for subsequent use, or the like. This allows the first controller 12 to prompt changes to travel plans of target vehicles 30 to thereby increase the applicability and effectiveness of services provided by the energy supply system 1.

Further, a certain energy supply vehicle 20 (first energy supply vehicle) that is allocated to supply energy to a certain target vehicle 30 is sometimes not able to supply energy to the target vehicle 30. For example, such cases include a case in which the energy supply vehicle 20 is involved in a breakdown or an accident. Upon determining that the energy supply vehicle 20 is not able to arrive at the supply start position at the supply start time, the information processing apparatus 10 may search for another energy supply vehicle 20 (second energy supply vehicle) to enable energy supply to the target vehicle 30. In a case in which another energy supply vehicle 20 that is able to supply energy to the target vehicle 30 is found, the information processing apparatus 10 updates the operation schedule of the other energy supply vehicle 20 and transmits the updated operation schedule to the other energy supply vehicle 20.

Alternatively, upon determining that an energy supply vehicle 20 is not able to arrive at a supply start position at a supply start time, the information processing apparatus 10 may search for a waiting point on a route included in the travel plan of the target vehicle 30. The information processing apparatus 10 may transmit, to the target vehicle 30, wait proposal information proposing that the target vehicle 30 wait at the waiting point.

Further, in other embodiments, an operation schedule of an energy supply vehicle 20 does not need to include a schedule for supplying energy to two or more target vehicles 30. Every time energy supply to a target vehicle 30 by the energy supply vehicle 20 ends, the information processing apparatus 10 may allocate, to the energy supply vehicle 20, another target vehicle 30 to which energy is to be supplied next. In that case, information regarding target vehicles 30 that are in need of energy supply but that cannot be included in the operation schedule of the energy supply vehicle 20 may be temporarily stored in the first memory 13 of the information processing apparatus 10.

When energy supply from the energy supply vehicle 20 to one target vehicle 30 included in the operation schedule ends, the second controller 22 notifies the information processing apparatus 10 of the end of energy supply via the second communication interface 21. Upon receiving the notification of the end of energy supply, the first controller 12 of the information processing apparatus 10 acquires positional information for the energy supply vehicle 20. As the positional information for the energy supply vehicle 20, positional information detected by the position detector 25 is transmitted to the information processing apparatus 10 via the second communication interface 21. Based on the position of the energy supply vehicle 20, the first controller 12 searches the information regarding the target vehicles 30 stored in the first memory 13 for another target vehicle 30 to which the energy supply vehicle 20 is to supply energy next. In this way, even when a target vehicle 30 is not operated as per the travel plan due to congestion, a drop-by, or the like, it is possible to reduce the impact on energy supply to other target vehicles 30. Further, it is ensured that the energy supply vehicle 20 can supply energy to a target vehicle 30 that is travelling nearby at that time.

(Processing of Information Processing Apparatus)

Figure 9:
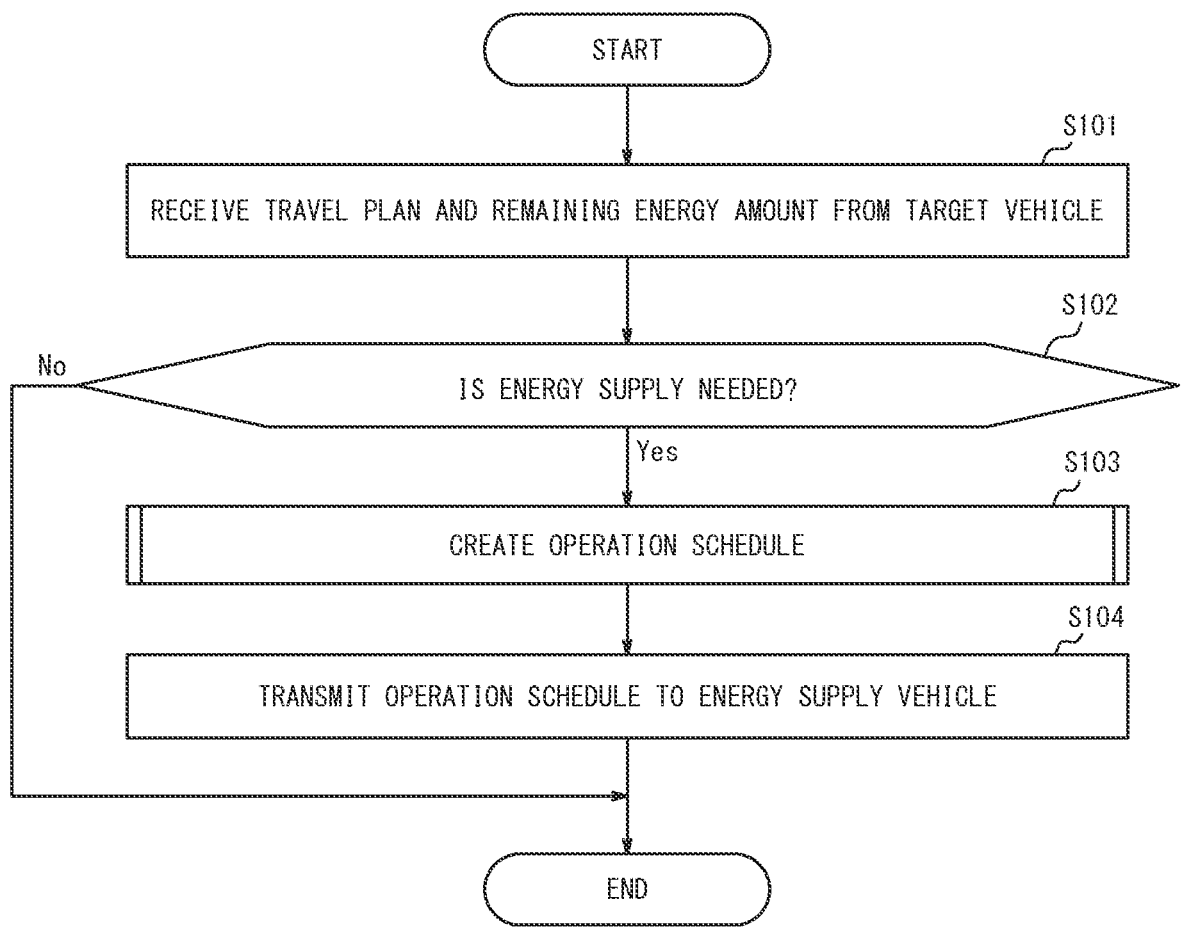
FIG. 9 is a flowchart illustrating an example of processing executed by an information processing apparatus.
Figure 10:
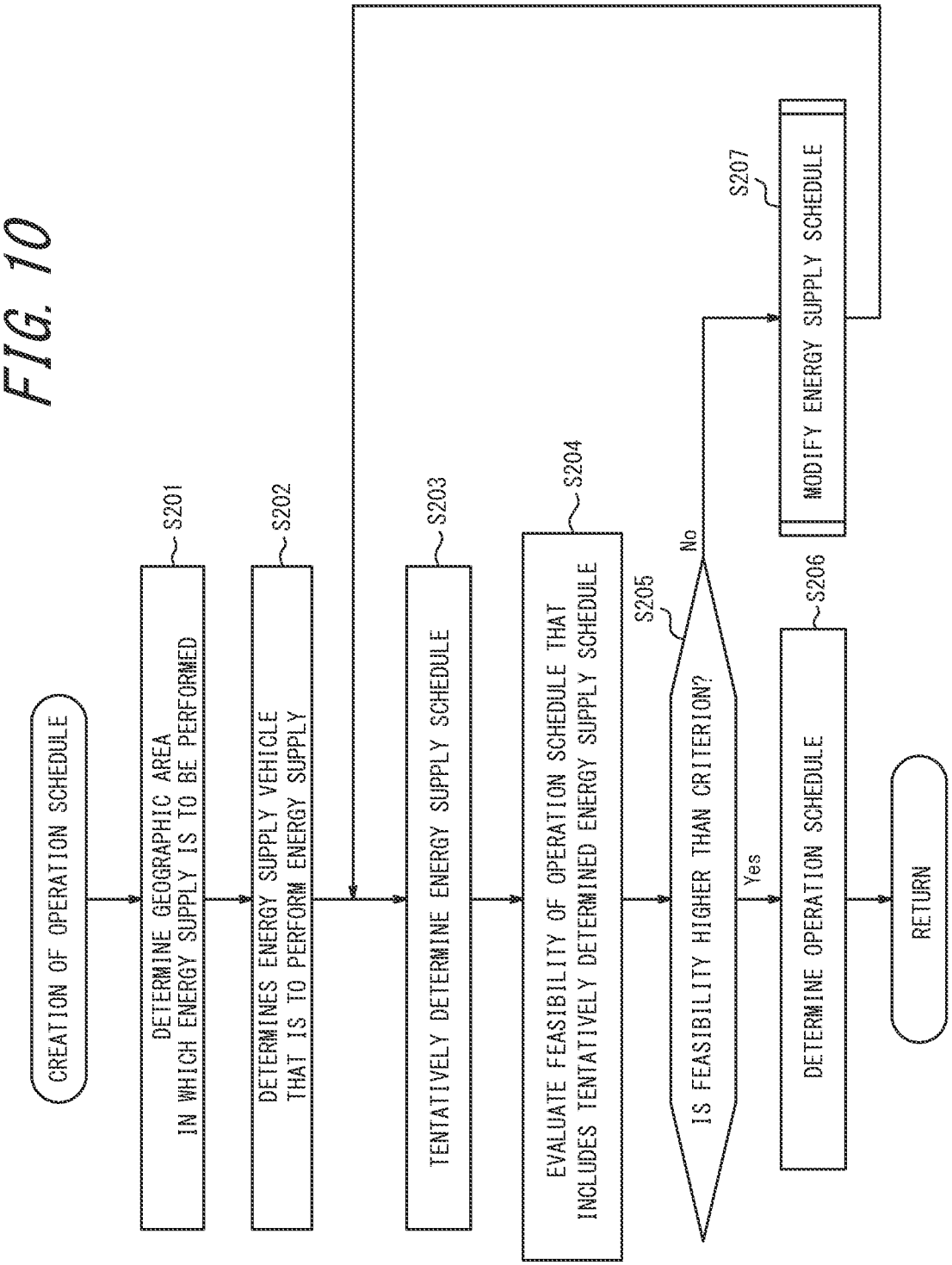
FIG. 10 is a flowchart illustrating operation schedule creation processing by the information processing apparatus.

With reference to FIG. 9 to FIG. 11, an example processing flow of a method performed by the information processing apparatus 10 will be described below. The method disclosed herein can be performed according to a program by a processor included in the information processing apparatus 10. Such a program can be stored in a non-transitory computer readable medium. Examples of non-transitory computer readable media may include, but are not limited to, a hard disk, RAM, ROM, flash memory, a CD-ROM, an optical storage device, and a magnetic storage device.

As illustrated in FIG. 9, the information processing apparatus 10 receives a travel plan and a remaining energy amount from a target vehicle 30 (Step S101).

Upon receiving the travel plan and the remaining energy amount from the target vehicle 30, the information processing apparatus 10 determines whether the target vehicle 30 is in need of energy supply (Step S102). Upon determining that the target vehicle 30 is not in need of energy supply (Step S102: No), the information processing apparatus 10 does not perform processing for the target vehicle 30.

On the other hand, upon determining that the target vehicle 30 is in need of energy supply in Step S102 (Step S102: Yes), the information processing apparatus 10 creates an operation schedule of an energy supply vehicle 20 (Step S103). Creation of the operation schedule will be described below with reference to FIG. 10.

In FIG. 10, the information processing apparatus 10 determines a geographic area in which energy supply to the target vehicle 30 is to be performed, by considering the travel plan and information on the remaining energy amount (Step S201). The geographic area corresponds to a coverage area 50 of an energy supply vehicle 20.

Subsequently, the information processing apparatus 10 determines an energy supply vehicle 20 that is to supply energy to the target vehicle 30 in the determined geographic area (Step S202). It is to be noted that Step S201 and Step S202 may be performed at the same time. For example, in order to determine a geographic area, an energy supply vehicle 20 that can be used in the geographic area may be considered.

Subsequent to Step S202, the information processing apparatus 10 tentatively determines an energy supply schedule for the energy supply vehicle 20 to supply energy to the target vehicle 30, based on the travel plan of the target vehicle 30 (Step S203).

The information processing apparatus 10 creates an operation schedule that includes the energy supply schedule that has been tentatively determined in Step S203. The information processing apparatus 10 evaluates the feasibility of the operation schedule by considering other supply schedules of the energy supply vehicle 20, current positional information, traffic information, or the like. (Step S204).

Upon determining that the feasibility of the operation schedule is higher than a predetermined criterion (Step S205: Yes), the information processing apparatus 10 determines the operation schedule including the tentatively determined supply schedule (Step S206).

Upon determining that the feasibility of the operation schedule is not higher than the predetermined criterion (Step S205: No), the information processing apparatus 10 modifies the energy supply schedule (Step S207). An example of modification of the energy supply schedule is described below with reference to FIG. 11.

In FIG. 11, the information processing apparatus 10 considers a change to be made to the energy supply schedule (Step S301). The change to the energy supply schedule may include a change to the travel plan of the target vehicle 30. The change to the travel plan includes a change to the travel route and a wait at a point on the travel route.

Based on a result of the examination in Step S301, the information processing apparatus 10 transmits, to the target vehicle 30, a change proposal for the travel plan (Step S302). It is to be noted that the flowchart of FIG. 11 is described on the presumption that the user of the target vehicle 30 or the third controller 32 accepts a change proposal for the travel plan. In a case in which a change proposal cannot be accepted, the information processing apparatus 10, for example, returns to Step S201 so as to create an operation schedule again. When it is determined that energy supply is not possible, the information processing apparatus 10 notifies the target vehicle 30 of this.

After proposing a change to the travel plan in Step S302, the information processing apparatus 10 establishes the change to the energy supply schedule (Step S303).

The information processing apparatus 10 performs a process of granting an incentive to the user of the target vehicle 30 that has accepted the change to the energy supply schedule (Step S304), and returns to the processing of FIG. 10.

After modifying the energy supply schedule in Step S207, the information processing apparatus 10 executes the processing of Step S203 and onward again.

Finally, upon determining the operation schedule (Step S206), the information processing apparatus 10 returns to the processing of FIG. 9.

In FIG. 9, once an operation schedule has been created in Step S103, the information processing apparatus 10 transmits the operation schedule to an energy supply vehicle 20 (Step S104). The information processing apparatus 10 may transmit an energy supply schedule to a target vehicle 30.

Thereafter, the energy supply vehicle 20 operates in accordance with the operation schedule, and performs energy supply to a target vehicle 30 that has received an energy supply schedule from an energy supply start position to an energy supply end position.

As described above, according to the energy supply system 1 of the present embodiment, it is possible to increase opportunities to supply energy for travelling to target vehicles 30 that travel on roads even in locations with a few energy supply facilities. Further, the energy supply system 1 can flexibly coordinate operation schedules of energy supply vehicles 20 or operation plans of target vehicles 30 even when congestion on roads, delays in energy supply vehicles 20 or target vehicles 30, or the like occur. This increases the applicability of the energy supply system 1.

Additionally, the present disclosure is not limited to the above embodiment, and various modifications and revisions may be implemented. For example, functions or the like included in each step, or the like can be rearranged without logical inconsistency, and a plurality of steps, or the like can be combined together or divided.

The invention claimed is:

1. An energy supply system comprising:
   at least one energy supply vehicle configured to be able to supply energy to at least one target vehicle that is subject to energy supply; and
   an information processing apparatus configured to:
      manage operation of the at least one energy supply vehicle,
      create an operation schedule including a supply schedule for supplying energy to the at least one target vehicle, based on a travel plan for the at least one target vehicle and information on a remaining energy amount that are received from the at least one target vehicle, and transmit the created operation schedule to the at least one energy supply vehicle, and
      evaluate feasibility of the operation schedule by considering other supply schedules of the at least one energy supply vehicle, current positional information, or traffic information, and upon determining that the feasibility is lower than a predetermined criterion based on the travel plan, the information processing apparatus transmits, to the at least one target vehicle, change proposal information to change the travel plan of the at least one target vehicle.

2. The energy supply system according to claim 1, wherein the information processing apparatus is configured to transmit the supply schedule to the at least one target vehicle.

3. The energy supply system according to claim 1, wherein
   the at least one target vehicle comprises a plurality of target vehicles, and
   the information processing apparatus is configured to be able to acquire a position of the at least one energy supply vehicle, and the at least one energy supply vehicle is configured to be able to supply energy sequentially to the plurality of target vehicles, and when energy supply from the at least one energy supply vehicle to one target vehicle in the plurality of target vehicles ends, the information processing apparatus searches for another target vehicle in the plurality of target vehicles to which the at least one energy supply vehicle is to supply energy next, based on a position at which the energy supply from the at least one energy supply vehicle has ended.

4. The energy supply system according to claim 1, wherein
   a geographic area in which energy supply to the at least one target vehicle is to be performed is defined for the at least one energy supply vehicle in advance, and the information processing apparatus is configured to create the operation schedule so that the at least one energy supply vehicle is to supply energy to the at least one target vehicle only within the geographic area.

5. The energy supply system according to claim 1, wherein
   the information processing apparatus is configured to be able to perform a process of granting a predetermined incentive to a user of the at least one target vehicle that has received the change proposal information and has accepted a change to the travel plan.

6. The energy supply system according to claim 1, wherein the information processing apparatus is configured to be able to acquire congestion information including information related to a congested area on a road and to determine the operation schedule so that a supply start position at which energy supply to the at least one target vehicle is to start does not fall within the congested area.

7. The energy supply system according to claim 1, wherein
   the at least one target vehicle and the at least one energy supply vehicle are automated vehicles that are autonomous, and while energy supply is being performed, the at least one target vehicle and the at least one energy supply vehicle perform automated driving in cooperation with each other.

8. The energy supply system according to claim 1, wherein
   the information processing apparatus is configured to acquire identification information for the at least one target vehicle along with the travel plan and to transmit the identification information to the at least one energy supply vehicle, and the at least one energy supply vehicle, when supplying energy to the at least one target vehicle, acquires identification information from the at least one target vehicle and collates the identification information transmitted from the information processing apparatus with the identification information acquired from the at least one target vehicle.

9. The energy supply system according to claim 1, wherein
the at least one energy supply vehicle comprises a plurality of energy supply vehicles, and
the operation schedule includes information regarding a supply start position and a supply start time at which energy supply from a first energy supply vehicle in the plurality of energy supply vehicles to the at least one target vehicle is to start, and upon determining that the first energy supply vehicle is not able to arrive at the supply start position on the supply start time, the information processing apparatus searches for a second energy supply vehicle in the plurality of energy supply vehicles that is different from the first energy supply vehicle so as to enable energy supply to the at least one target vehicle.

10. The energy supply system according to claim 1, wherein
the at least one energy supply vehicle comprises a plurality of energy supply vehicles, and
the operation schedule includes information regarding a supply start position and a supply start time at which energy supply from a first energy supply vehicle in the plurality of energy supply vehicles to the at least one target vehicle is to start, and upon determining that the first energy supply vehicle is not able to arrive at the supply start position on the supply start time, the information processing apparatus searches for a waiting point on a route included in the travel plan of the at least one target vehicle and transmits, to the at least one target vehicle, wait proposal information proposing that the at least one target vehicle wait at the waiting point.

11. The energy supply system according to claim 1, wherein the travel plan includes an energy consumption required to travel a predetermined route based on a determination of a type of road and a power efficiency forecasted for the type of road.

12. An information processing apparatus that manages operation of at least one energy supply vehicle configured to be able to supply energy to at least one target vehicle that is subject to energy supply, the information processing apparatus comprising:
a communication interface configured to be able to receive, from the at least one target vehicle, a travel plan for the at least one target vehicle and information on a remaining energy amount; and
a controller configured to:
create an operation schedule including a supply schedule for supplying energy to the at least one target vehicle, based on the travel plan and the information on the remaining energy amount that are received through the communication interface, and transmit the created operation schedule to the at least one energy supply vehicle via the communication interface, and
evaluate feasibility of the operation schedule by considering other supply schedules of the at least one energy supply vehicle, current positional information, or traffic information, and upon determining that the feasibility is lower than a predetermined criterion based on the travel plan, the controller transmits, via the communication interface to the at least one target vehicle, change proposal information to change the travel plan of the at least one target vehicle.

13. The information processing apparatus according to claim 12, wherein
the controller is configured to transmit the supply schedule to the at least one target vehicle via the communication interface.

14. The information processing apparatus according to according to claim 12, wherein
the at least one target vehicle comprises a plurality of target vehicles, and
the communication interface is configured to be able to acquire a position of the at least one energy supply vehicle, and the at least one energy supply vehicle is configured to be able to supply energy sequentially to the plurality of target vehicles, and when energy supply from the at least one energy supply vehicle to one target vehicle in the plurality of target vehicles ends, the controller searches for another target vehicle in the plurality of target vehicles to which the at least one energy supply vehicle is to supply energy next, based on a position at which the energy supply from the at least one energy supply vehicle has ended.

15. The information processing apparatus according to claim 12, wherein
a geographic area in which energy supply to the at least one target vehicle is to be performed is defined for the at least one energy supply vehicle in advance, and the controller is configured to create the operation schedule so that the at least one energy supply vehicle is to supply energy to the at least one target vehicle only within the geographic area.

16. The information processing apparatus according to claim 12, wherein the travel plan includes an energy consumption required to travel a predetermined route based on a determination of a type of road and a power efficiency forecasted for the type of road.

17. A method comprising:
receiving, by an information processing apparatus and from at least one target vehicle that is subject to energy supply, a travel plan for the at least one target vehicle and information on a remaining energy amount;
creating, by the information processing apparatus, an operation schedule including a supply schedule for supplying energy to the at least one target vehicle, based on the travel plan and the information on the remaining energy amount that are received;
transmitting, by the information processing apparatus, the created operation schedule to at least one energy supply vehicle configured to be able to supply energy to the at least one target vehicle;
evaluating, by the information processing apparatus, a feasibility of the operation schedule by considering other supply schedules of the at least one energy supply vehicle, current positional information, or traffic information; and
upon determining that the feasibility is lower than a predetermined criterion based on the travel plan, transmitting, by the information processing apparatus, to the at least one target vehicle, change proposal information to change the travel plan of the at least one target vehicle.

18. The method according to claim 17, further comprising transmitting, by the information processing apparatus, the supply schedule to the at least one target vehicle.

19. The method according to claim 17, wherein
the at least one target vehicle comprises a plurality of target vehicles,
the at least one energy supply vehicle is configured to be able to supply energy sequentially to the plurality of target vehicles, and
the method further comprises
when energy supply from the at least one energy supply vehicle to one target vehicle in the plurality of target vehicles ends, acquiring, by the information processing apparatus, a position at which the energy supply from the at least one energy supply vehicle has ended, and searching, by the information processing apparatus, for another target vehicle in the plurality of target vehicles to which the at least one energy supply vehicle is to supply energy next based on the position.

20. The method according to claim 17, wherein
a geographic area in which energy supply to the at least one target vehicle is to be performed is defined for the at least one energy supply vehicle in advance, and the information processing apparatus is configured to create the operation schedule so that the at least one energy supply vehicle is to supply energy to the at least one target vehicle only within the geographic area.

\* \* \* \* \*